(12) United States Patent
Sherman et al.

(10) Patent No.: US 8,874,071 B2
(45) Date of Patent: Oct. 28, 2014

(54) METHOD AND APPARATUS FOR PRIORITIZING AND ROUTING EMERGENT ACTIVITY REPORTING

(75) Inventors: Michael Jay Sherman, Herndon, VA (US); Bryan Scot Ware, Herndon, VA (US); Jaffrey Ali, Falls Church, VA (US); Robert Scott Kerr, Ashburn, VA (US); Anthony Francis Beverina, Falls Church, VA (US); Lindwood Dale Hudson, Sterling, VA (US)

(73) Assignee: Digital Sandbox, McLean, VA (US)

( * ) Notice: Subject to any disclaimer, the term of this patent is extended or adjusted under 35 U.S.C. 154(b) by 82 days.

(21) Appl. No.: 13/279,022

(22) Filed: Oct. 21, 2011

(65) Prior Publication Data
US 2012/0100825 A1 Apr. 26, 2012

Related U.S. Application Data

(60) Provisional application No. 61/405,541, filed on Oct. 21, 2010.

(51) Int. Cl.
*H04W 4/22* (2009.01)
*H04W 4/02* (2009.01)
(52) U.S. Cl.
CPC .. *H04W 4/22* (2013.01); *H04W 4/02* (2013.01)
USPC ................... 455/404.2; 455/404.1; 455/411; 455/414.1; 455/466; 455/432

(58) Field of Classification Search
USPC ............. 455/404.1–404.2, 412.1–412.2, 466, 455/432
See application file for complete search history.

(56) References Cited

U.S. PATENT DOCUMENTS

| 5,539,645 | A * | 7/1996 | Mandhyan et al. | 701/119 |
| 8,340,628 | B2 * | 12/2012 | Taylor et al. | 455/404.1 |
| 2009/0258642 | A1 * | 10/2009 | Golenski | 455/426.1 |
| 2010/0285771 | A1 * | 11/2010 | Peabody | 455/404.2 |

* cited by examiner

*Primary Examiner* — Michael T Vu
(74) *Attorney, Agent, or Firm* — DLA Piper LLP US (57) ABSTRACT

A method and system for prioritizing and reporting an observation is disclosed. The observation is preferably received from a mobile device that determines a location of the observation and provides a user of the mobile device with a preselected list of classifications for the observation. The observation is prioritized based at least in part on the location and the classification associated with the observation. The priority may depend on a distance between the location in the observation and a catalog of objects of interest. The priority may also depend on the existence of other observations having the same classification within a threshold distance of the observation. The prioritized observation is routed to appropriate personnel based on the determined priority. The prioritized observation may also be included in an ordered list based on priority and/or rendered in a geospatial view with at least one display attribute being based on the priority.

18 Claims, 7 Drawing Sheets

Fig. 7

METHOD AND APPARATUS FOR PRIORITIZING AND ROUTING EMERGENT ACTIVITY REPORTING

CROSS-REFERENCE TO RELATED APPLICATIONS

This application claims priority from U.S. Provisional Application No. 61/405,541, filed Oct. 21, 2010, the entirety of which is incorporated by reference herein.

BACKGROUND

Every day, in all facets of life, behaviors and activities occur and are observed that may be indicators of an impending event or a need. Impending events may be adverse events such as crimes, terrorist attacks, automobile accidents or pandemic disease outbreak. Needs may be the need for a special type of response during an accident or disaster (e.g. evacuation of special needs populations or the need for specialized HAZMAT equipment following a spill). Often, although these activities are, observed, those observations do not get into the hands of individuals or organizations that need to know or assess the "emergent situation" (defined as the impending event, need, or opportunity to act). Even if they do get reported, they often are not prioritized correctly (or at all) or are not shared with all of the organizations that have a need to know.

DETAILED DESCRIPTION

In the following detailed description, a plurality of specific details, such as types of materials and dimensions, are set forth in order to provide a thorough understanding of the preferred embodiments discussed below. The details discussed in connection with the preferred embodiments should not be understood to limit the present inventions. Furthermore, for ease of understanding, certain method steps are delineated as separate steps; however, these steps should not be construed as necessarily distinct nor order dependent in their performance.

Method and apparatuses for prioritizing and routing emergent activity reporting are disclosed herein. The methods and apparatuses may be useful for emergent situations where existing or official sources are not readily available or are not timely, and prioritized information routed to the proper communities of interest is desired to mitigate risks or maximize opportunities to act. These methods and apparatuses may overcome one of the major problems with activity reporting from the field wherein a flood of reports is not prioritized to allow an analyst, operational decision maker or consumer to act on important items first.

Emergent situations may be subdivided into three categories, all of which may be processed using the methods and apparatuses disclosed herein:

1) Activities the observer believes to be suspicious, illegal, dangerous or inappropriate. For example, suspicious activities involving placement of packages, vehicles abandoned for long periods of time, or people taking photographs of iconic structures.
2) Adverse situations where response and recovery needs are best determined by functional specialists. For example, assessment personnel reporting damage locations from the field after a hurricane or flood event.
3) Special interest activities where the observer wishes to indicate a unique or timely observation with a specific community of interest. For example, sale sharing communities reporting retail sale events.

Figure 1:
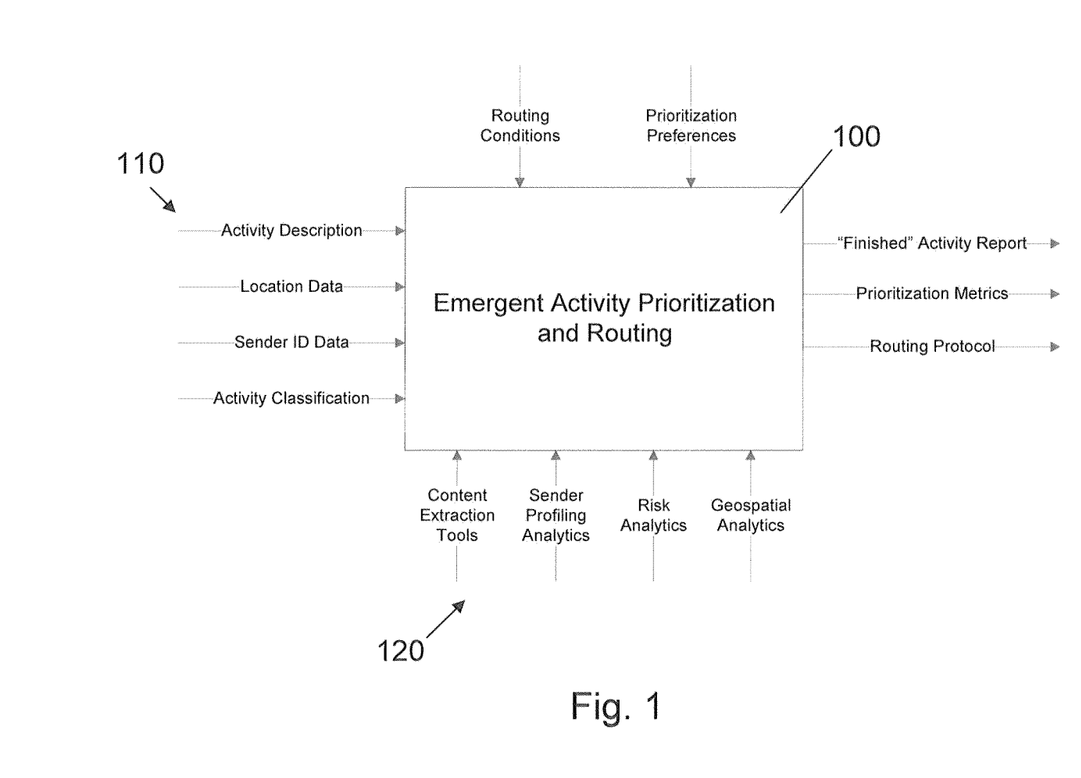
FIG. 1 is input/output diagram for an emergent activity reporting prioritization and routing method according to one embodiment.

FIG. 1 is a diagram showing inputs and outputs of a method 100 that may be used for prioritizing and routing emergent activity information of all three of the above categories of emergent situations. The goal of the method 100 is to provide an activity report that is complete and descriptive, is prioritized according to analytic metrics, and is routed to one or more "communities of interest." Communities of interest are defined as individuals or organizations deemed to have a need to know because they a) may be adversely affected by the emergent situation; or b) have responsibility to respond or have oversight of response to the situation, or c) have opted in because they wish to be apprised of the emergent risk or opportunity.

The method 100 receives inputs 110 and acts on the inputs using Prioritization and Routing analytics comprising in part the types of tools 120 indicated at the bottom of FIG. 1. Inputs 110 to the method 100 are provided by an observer (usually a person or a device, where the device could be a model, database, or external analytic method). The observer is presumed to be reporting on an observed behavior, activity or situation the observer believes to be an indicator of an emergent situation. The inputs 110 may be grouped together in a single emergent activity observation report (referred to hereinafter as simply an observation), and an observation may include all or less than all of the following:

Activity Description—this is descriptive information about the observation including, but not limited to a text description provided by the observer, photographs, video, audio recordings, time of observation, weather conditions, etc.

Location Data—location data including, but not limited to the location of the observer, the location of the observed situation, the distance between the observer and the situation, the direction the observer is facing, the speed at which the observer is moving, etc. In embodiments employing a mobile application for observation reporting as discussed in further detail below, the source of the location data may be a mobile device (e.g., a cell phone) on which the application runs.

Sender ID Data—identification data including, but not limited to the name and personal information for the observer, role and expertise of the user (to establish credibility) and identification information of the device used for reporting.

Activity Classification—an indicator of the type of observation being made. Examples could include suspicious package, dangerous driving, need for assistance, etc. In some embodiments employing a mobile application for observation reporting as discussed in further detail below, the classification may be is selected from a list of possible classification types presented to the observer by the mobile device.

The method 100 may use analytic processes 120 to create additional information from the information submitted by the observer in the observations in some embodiments. These analytic processes may include those discussed in the following paragraphs.

Content Extraction—Observer-submitted content is analyzed to provide further information that can be used in prioritization and routing. Examples include facial recognition analysis that further identifies an individual, or text mining applications that identify keywords. Text analysis is used to extract entities (proper nouns, locations, and people). Furthermore, text analysis is employed to extract sentiment and concepts from the content—such as negative connotations used in audio or text descriptions, larger concepts of events not obvious when looking at each word separately ("the deal goes down at noon" as a phrase may provide prioritization information whereas the individual words in that phrase do not).

Sender Profiling Analytics—Identification of non-anonymous users is used to establish credibility of the sender, or establish a pattern of use that indicates credibility. A certain submitter may be best at identifying suspicious vehicles, so all such reports from this user would have a higher confidence in the prioritization scoring.

Risk Analytics—Risk analytics are used to analyze the potential risks indicated by the activity report. Threat likelihood, vulnerabilities of nearby sites, events, people or groups of people, and potential consequences are analyzed through risk algorithms to feed prioritization and routing methods. A site could be an event venue or supporting critical infrastructure like a utility. An event could be a party, a sporting event, or similar gathering of people. People and groups of people could be VIPs, a protectee, a suspicious person, members of a community of interest, or large gathering of citizens. Using catalogs of assets, events, and people, and information about their location and criticality and feeds of live information about assets, events, and people, risk may be used to influence the prioritization scoring. Live feeds could include 911 calls for service, traffic alerts, weather alerts, public safety incident management feeds, or social networking feeds such as Twitter. For example, a suspicious package next to a State government building is more important than a person seen taking pictures in the middle of a field. Vulnerability of the asset, person(s) or event, combined with possible consequences and threat likelihood of the attack type (IED) factor into the prioritization score. Risk is defined as the combination of threat likelihood, vulnerability of an asset, event, or person(s) to that threat, and the consequences from that threat if it were to succeed. As used herein, "asset" refers to physical items such as buildings, sites, vehicles, and any other thing of interest to a user or community of users. The term "object of interest" will be used to refer to an asset, event, person or groups of people that are of concern.

Geospatial Analytics—Analysis of geospatial relationships are used to correlate proximity of multiple messages and indicate nearby communities of interest or assets, events, and person(s) that may be impacted by the emergent situation. A possible suspicious vehicle next to a critical asset receives a higher prioritization score than a vehicle parked in the middle of a field. The contribution to the prioritization score is related to distances from catalogs of important assets, events, and person(s).

It should be noted that methods and apparatuses discussed herein may, in some embodiments, process observations on behalf of more than one entity, and the observations being processed on behalf of one entity may overlap partially, wholly or not at all with observations being processed on behalf of other entities. For example, observations may be processed on behalf of a federal and a local law enforcement agency, or a local law enforcement agency and a private property owner such as the owner of a shopping mall or sports stadium, and the observations may be shared in whole or in part between these two organizations. It should further be understood that, in situations in which the same observation is being processed on behalf of different entities, the observations may be processed differently for each entity. For example, the geospatial analytics may be different for federal and local law enforcement agencies in that they may have different geographic areas of responsibility. Likewise, the catalogs of important assets, events and person(s) for the local law enforcement agency and the private property owner may be different. Thus, the geospatial analytics may indicate a similar priority level for an observation of suspicious package next to an entrance of a crowded shopping mall for both the local law enforcement agency and the private property owner, but an observation of a similar suspicious package next to an entrance of a train station not located near the shopping mall may result in very different geospatial analytics when processed on behalf of the same local law enforcement agency and shopping mall owner.

Scoring and Prioritization

In some embodiments, there may be hundreds of reports being uploaded every hour. It therefore does no good to any consumer of reporting information to simply see all of the reports in equal weighting in similar views. The purpose of the analytic methods is to analytically score incoming reports to allow for a prioritization scheme. A prioritization scheme allows for an ordered investigation to help the consumer address important items first, while at the same time not simply filtering out an arbitrary set.

The scoring algorithm takes into account many factors to set a score for each item. The factors included in the scoring algorithm are submission time and proximity in time to similar reported items—activity reports at a certain time may denote more importance than ones reported at a different time, for example, suspicious packages at the height of rush hour in a train station should be prioritized above similar reports at 2 am where human traffic is at a minimum. Furthermore, items of a similar nature which are grouped together in a temporal sense may increase the score, for example multiple reports of the same activity type all grouped together at one time would indicate more than one observer seeing the same general activity (a dozen people report the same activity in a window from 9 am to 9:10 am would tend to indicate it is a more obvious, important event).

geographical location and proximity to other events or assets of interest; using the location of the activity report in comparison with locations of important assets (buildings, infrastructure) adds more to the score when activities are reported in proximity to important assets. Computing the distance between two points, the distances from activity reports to assets are all used to compute a score which varies inversely to the distances from assets. For example, a report of a suspicious package 10 meters from a government building would yield a higher score than a similar report of an item 1000 meters from the same building.

activity type; the score for activity type varies according to the type of activity—for example, a suspicious package could result in a higher score contribution than that of a report of a suspicious person taking pictures due to the immediate nature of the former report.

key words and phrases found in the description text including people, places, things; an analyst may want to score reports higher which include certain concepts such as "bridge" or "crowd". These phrases and key words may be used to adjust scoring up or down.

confidence rating based on credibility of the observer, number of similar observations, patterns of known observers (patterns of known observers may encompass both the type and location of observations made by reporters in the past—for example, a reporter may have always been entirely credible in the past reporting on suspicious vehicles in their block of residence—therefore, based on this pattern of historical successful reports, new reports matching that pattern will be scored with greater confidence) and other factors;

risk relevance (does the observation indicate a specific threat type, or suggest an incident where there is a known vulnerability, or a type of consequence?); and arbitrarily configured priority ratings acting as a commander override—the prerogative of the analyst to manually adjust scoring.

Figure 2:
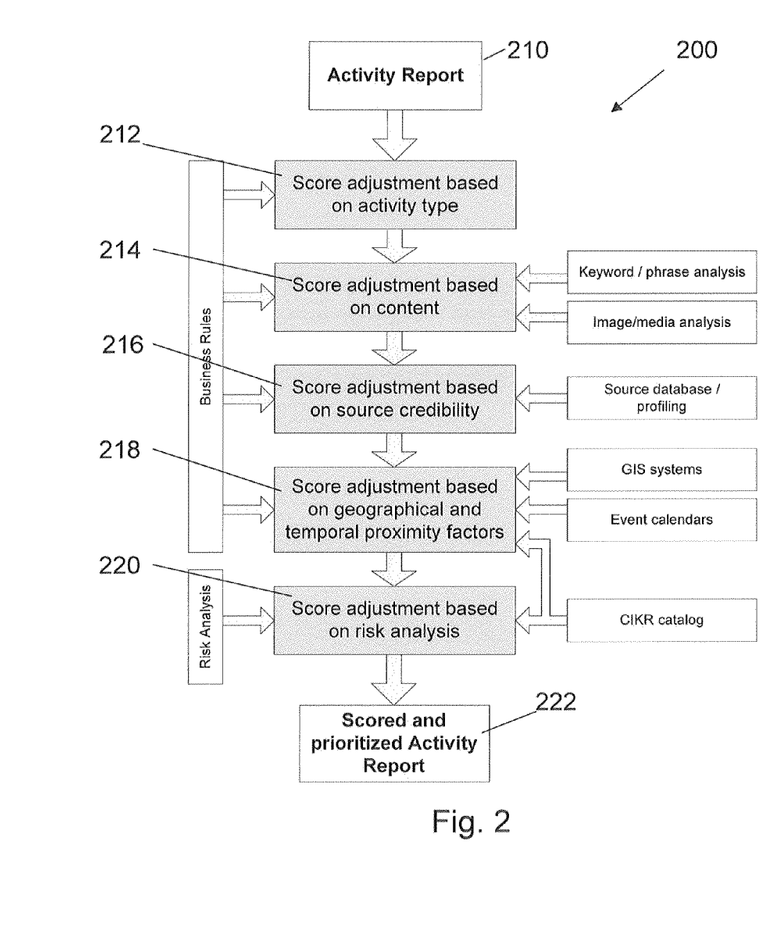
FIG. 2 is a block diagram of a scoring process according to an embodiment.

FIG. 2 is a block diagram 200 illustrating a scoring process that may be used in the method 100 according to some embodiments. The scoring process begins with the input of an activity report (an observation) at step 210. An activity report starts the process with a score of 1.0. At each step 212-220 of the scoring process, the score is multiplied by factors computed at each step of the way. The score may be adjusted up or down by multiplying by factors greater to or less than 1.0 at each step. Discounting an activity report completely can be done at any step in the process by multiplying the score by a factor of 0. The scoring process of FIG. 2 includes activity type scoring (step 212), content based scoring (step 214), source credibility scoring (step 216), geographic and temporal proximity scoring (step 218), and risk analysis scoring (step 220). The output of the scoring process is a scored and prioritized activity report 222.

Of particular interest is the notion of giving a higher score to items which indicate the same activity type within the same geographical location. The theory is that if two or more people see and report the same suspicious activity, more credibility can automatically be assigned to those reports, raising their score. The distance between events to provide this score addition is set at the server, and is different for each activity type (for example, distance between suspicious odor reports would be much larger for the same activity than for a suspicious package).

The scoring process is run on a periodic basis to constantly update scores of previous observations. This period may be as fast as the machine can handle (real-time), or on a period of an hour or a day. Scores with contributions based on the time of the activity report will therefore continually update, and score contributions from the age will therefore be in constant change. For example, at the moment one activity report comes in the score contribution from time will be a value A. At every period when the scoring process is run the time score will be less than A as the score falls off to be inversely proportional to the age of the activity report.

In the scoring process above, the score is calculated by multiplying a base score by factors calculated in each of the successive scoring routines. Those of skill in the art will understand that this is but one exemplary method for calculating a score, and other methods (e.g., adding scores from each successive routine to arrive at a total score) may be employed in other embodiments.

Routing

To route outputs to the desired communities of interest, the method considers a combination of the following factors to determine the routing protocol for the prioritized observation (i.e., a list of recipients to which the prioritized observation will be sent, with a null list being a possibility when observations have received a low or zero score in the scoring process described above, and possibly additional information such as rendering information):

Score (from the scoring routine discussed above);

Time of the observation—certain communities of interest may have oversight of a given type of situation during an "operational period" and thus would be notified;

Location—certain communities of interest have jurisdiction over events that occur within a defined geographic footprint and thus would be notified;

Risk impacts—organizations that could be impacted by the event due to their involvement, proximity, or potential consequences must be notified so they can take action;

Risk Mitigation ownership—organizations that have responsibility for mitigating certain threat likelihoods, vulnerabilities, or consequences are notified; and Subscribers—organizations or individuals that opt to receive messages.

As discussed above, the score from the scoring process includes a component based on geographic proximity factors (e.g., how close the observation is to the mall owner's property). Thus, if the mall owner has indicated a threshold score below which the owner wants no notification of observations, the consideration of the location in the calculation of the score may result in the observation not being reported to the mall owner. However, the mall owner may have a second criterion—that may vary by time of day—based strictly on location (e.g., the mall owner might not want any observations not located on his property during non-business hours). Thus, despite location already being reflected to some degree in the score, the location of the observation may be used again in the routing procedure.

Figure 3:
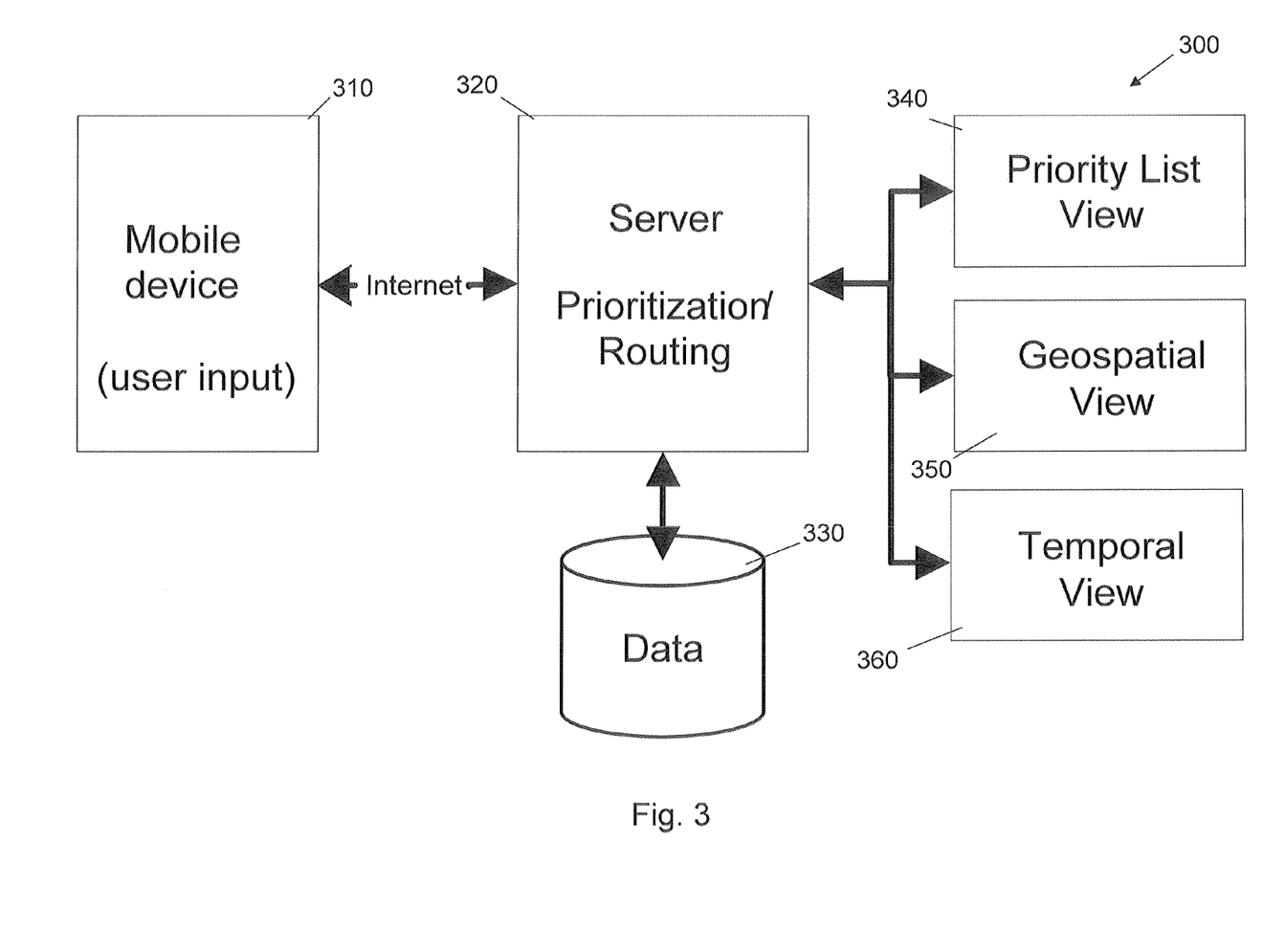
FIG. 3 is a block diagram of a system for practicing the method of FIG. 1 according to an embodiment.

An apparatus 300 for prioritizing and routing emergent activity reporting according to one embodiment is shown in FIG. 3. The apparatus 300 allows observers to submit observations to a central location. The apparatus 300 then analytically determines prioritization metrics and routing protocols and sends reports out to external applications and/or display devices based on routing protocols using the methods discussed above. Additionally, the apparatus 300 may include display devices (not shown in FIG. 3) to aid communities of interest to more effectively consume and analyze reporting.

The apparatus 300 comprises three main parts: One or more mobile devices 310 on which a mobile applications runs, the server 320 and associated database 330, and the display applications 340, 350, and 360.

The mobile device 310 may be a mobile device such as a smartphone, a tablet, a special purpose device designed specifically for interaction with the server 320, or any other device capable of executing an application and communicating with the server 320, preferably wirelessly. An application is installed on the device 320. The application may be user-downloadable. The application may provide a simple interface to allow a user to report any emergent activities they may encounter in their daily routine or as part of their job. An exemplary interface screen 410 is shown on the mobile device 310 shown in FIG. 4. An activity type is selected from a pre-populated list of activities, such as Package or Vehicle, via an Activity drop-down menu 420. A description may be entered in free-form text in the description text box 430. A picture may be taken using the mobile device's integrated camera via the "Add Image" button 440. Upon submission of the observation (e.g., by pressing the "Submit" button 450), the device location is also sent providing latitude and longitude. The device location may be obtained in any manner known in the art, including via a GPS receiver integrated into the mobile device 310 or by using multilateration techniques. The observation may be sent over SSL-secured HTTP to the server 320.

Figure 4:
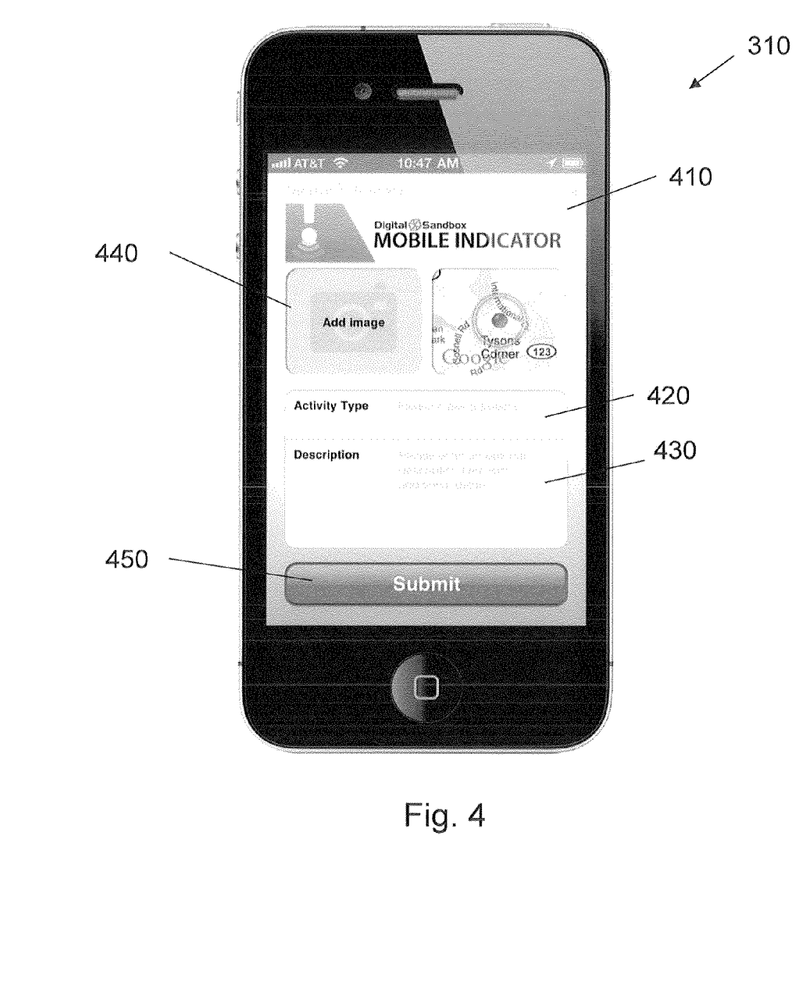
FIG. 4 is a screen shot of an application running on a mobile device included in the system of FIG. 3 according to an embodiment.

In some embodiments, the configuration of the mobile application is pulled down from the server 320, therefore users may have different sets of activity lists from which to choose. For example, using the same application apparatus, user A may see a list of suspicious activity types (Package, Vehicle, etc) while user B may use a configuration which contains damage assessment types (Minor, Severe, etc). The application remains flexible to allow the server to provide a configuration for use based on a configuration name entered by the user. Information sent to the application for configuration includes logo imagery, activity list, and whether or not certain personal information is required from the user (name, phone number, email address).

The server 320 stores the observations from the mobile devices 310 (and, in some embodiments, observations from other sources) in a relational database 330. The server 320 may score items as they come in based on a variety of factors including location, proximity to other reports, report type, and key word and phrase matching found in the descriptions as discussed above in connection with the scoring algorithm 200 of FIG. 2. The server 320 may provide a GeoRSS feed of prioritized activity reports in an XML format. Depending on the ultimate consumer of these items, the prioritized activity reports are routed to particular subscribers based on their scoring preferences, location, and other settings as discussed above in the section labeled "ROUTING."

An exemplary server 320 server may be a Microsoft Server 2008 machine with Microsoft SQL Server 2008. Application code runs on this server 320 with data storage provided by an SQL server relational database 330. The server 320 requires a connection to the internet or other communications medium to receive activity messages from the mobile devices 310. Those of skill will recognize that other hardware platforms and architectures may also be used. Moreover, it should be understood that the server 320 may by implemented on one or more physical computer devices. In embodiments in which the server is implemented on multiple devices, the multiple devices may all perform the same functions or the functionality of the server 320 may be divided among the multiple devices (e.g., one device performing the scoring functions discussed above, a second device performing the display functions discussed above, etc.). Accordingly, references to a server or a computer herein should be understood to refer to one or more physical devices, each performing identical or different functions.

Figure 5:
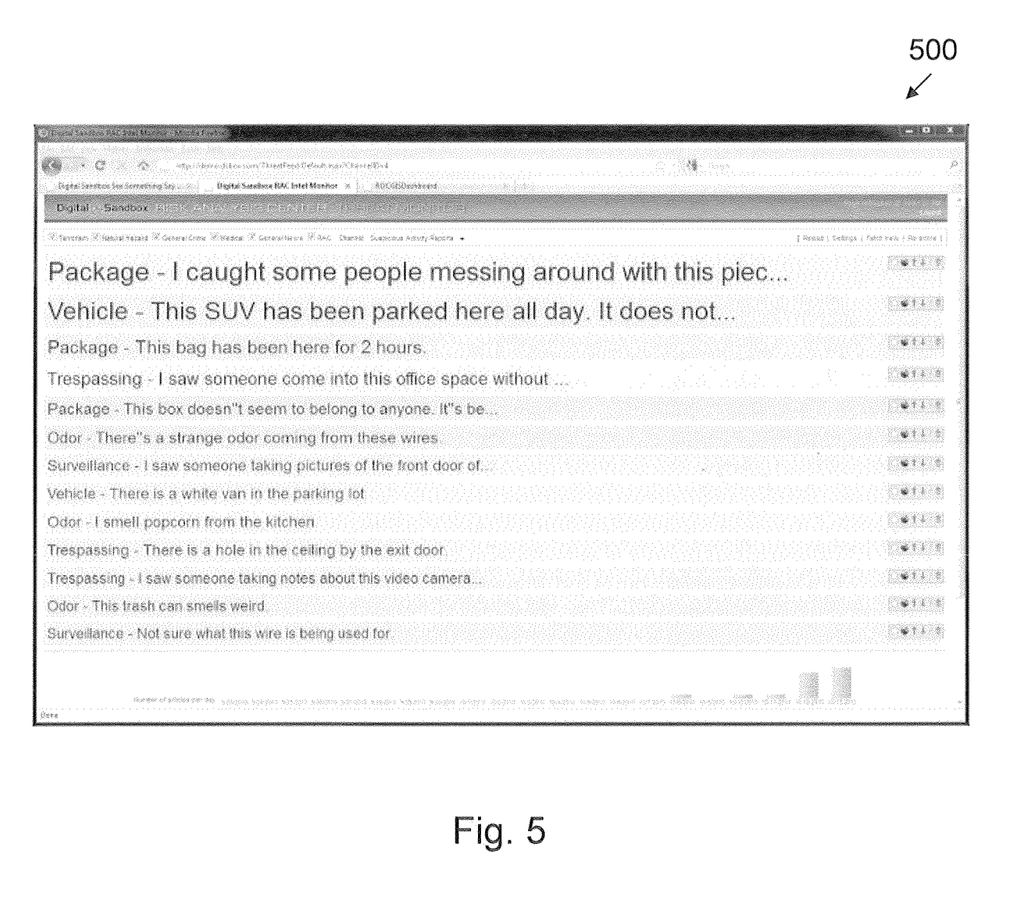
FIG. 5 is a screen shot of a prioritized list display of observations according to an embodiment.

The result of the processing of the observations by the server 320 is a prioritized, geo-located list of observations/activity reports. These may be visualized and used in three distinct manners: a priority-weighted list view, a geospatial view, and a temporal view. The priority-weighted list view may show important observations at the top of the display at all times for continuous monitoring. Observations may be displayed with a title font size proportional to the score of the observation—therefore higher scoring observations are not only at the top of the list, but also appear in a large font to draw attention from the analyst/user/consumer. An exemplary priority-weighted list view 500 is shown in FIG. 5. A user may consume this view through a web browser using a web application served by the server 320 or through a mobile application that connects to server 320.

Figure 6:
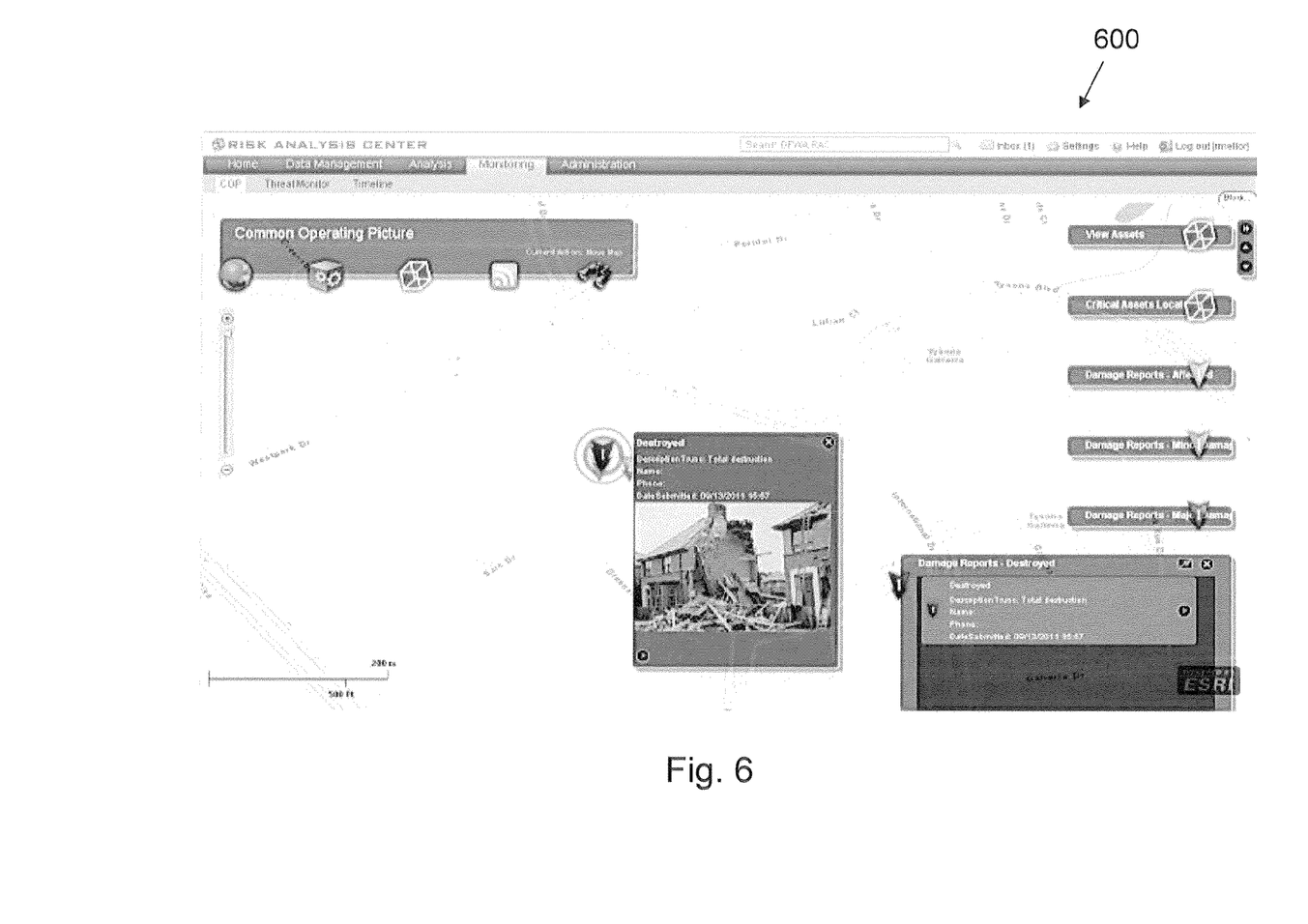
FIG. 6 is a screen shot of a prioritized geospatial display of observations according to another embodiment.

The geospatial view shows observations with icons based on priority and type of activity placed at the latitude and longitude of the observation. This, combined with a geospatial view of important resources and objects of interest and other live feeds of data, allows operational response to incident reports of high priority. An exemplary geospatial display 600 is shown in FIG. 6. A user may consume this view through a web browser using a web application served by the server 320 or through a mobile application that connects to server 320.

Figure 7:
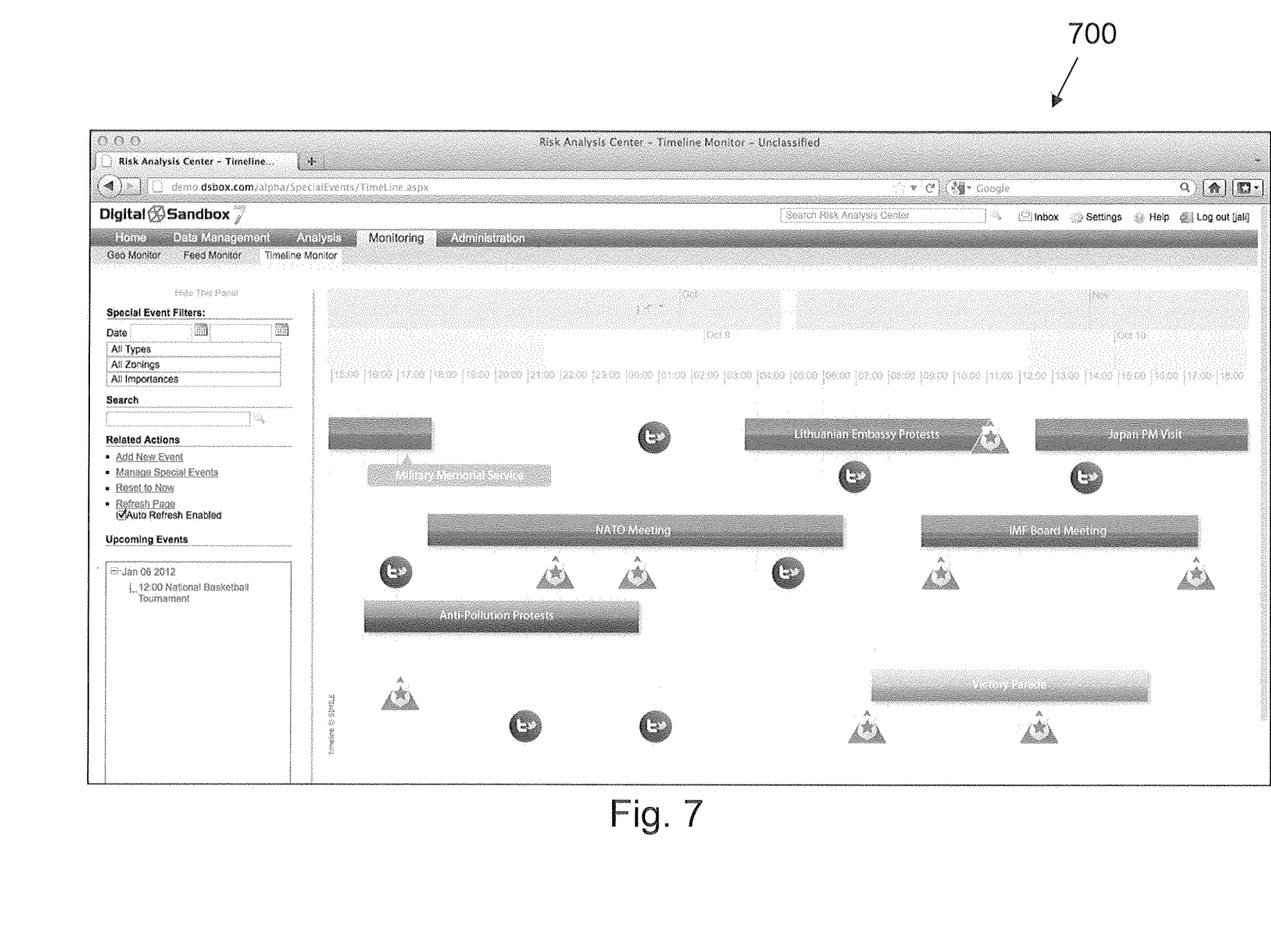
FIG. 7 is a screen shot of a temporal display of events according to another embodiment.

The temporal view shows observations in a timeline view allowing these observations to be view in a temporal context. Such a view can be configured by the user to sort on priority and also by time of observation. Additionally, by showing events that are known (such as scheduled events like a reception or flash events like a political demonstration), the user can see prioritized observations in context with events they may be associated with. An exemplary temporal display 700 is shown in FIG. 7. A user may consume this view through a web browser using a web application served by the server 320 or through a mobile application that connects to server 320.

In addition to the prioritized list view of activity reports ranked by score, a service provides email alerts for items over a threshold score. When a very critical item is scored extremely high an email alert or SMS alert may be dispatched to a list of users subscribing to this activity feed.

It will be understood form the discussion above that the method discussed herein are flexible and adaptable to various observation types in a wide variety of contexts. Some exemplary uses of the method disclosed herein are set forth below:

Reporting Activities that are Suspicious or May be Illegal, Dangerous, or Inappropriate Homeland Security Suspicious Activity Reporting: The general public uses mobile applications to report suspicious behavior/activities and messages are prioritized and routed to intelligence and law enforcement agencies.

Amber Alert Reporting: The general public uses mobile applications to report sightings related to amber alert information that is published in the media and through the mobile application itself. Messages are prioritized and routed to law enforcement.

Neighborhood Watch Reporting: Neighborhood watch teams use mobile applications to report suspicious activities and messages are prioritized and routed to local law enforcement and emergency services.

Special Event Security and Fan Behavior: Attendees of an event use mobile applications to report suspicious, aggressive, and inappropriate behavior and messages are prioritized and routed security, law enforcement, team, and league officials.

Illegal Alien Reporting: The general public uses mobile applications to report suspected illegal aliens and messages are prioritized and routed to intelligence and law enforcement agencies.

Border Screening: The general public uses mobile applications to report suspected illegal border activity and messages are routed to appropriate border control agencies.

Biosurveillance: The general public uses mobile applications to report on illnesses and symptoms and messages are aggregated and analyzed to provide early warning of outbreaks and routed to public health officials.

DUI and Aggressive Driving Reporting: Motorists use mobile applications to report suspicious or aggressive driving behavior and messages are prioritized and routed to law enforcement agencies.

Citizen Crime Reporting: The general public uses mobile applications to report suspicious or illegal behavior and messages are prioritized and routed to intelligence and law enforcement agencies.

Corporate Personal Security: Corporate employees use mobile applications to check in on travel status and whereabouts and locations data is correlated to known risks to identify security issues. Messages are routed to the employee, corporate security, and management.

Traffic Reporting: The general public uses mobile applications to report on traffic construction, delays, and accidents and messages are routed to the general public, subscribers, the media, and transportation agencies Law Enforcement Queuing: The general public uses mobile applications to request assistance from law enforcement in emergent situations and messages are prioritized and routed to officers and emergency services in close proximity.

Expert Assessment of Emergent Situations

Airport Screening: Roaming behavioral analysts use mobile applications to report and characterize suspicious behavior and messages are prioritized and routed to TSA Screeners and law enforcement agencies.

Emergency Responder Suspicious Activity Reporting: First responders on a call for service use mobile applications to report and characterize suspicious behavior and situations not related to the call and messages are prioritized and routed to intelligence and law enforcement agencies.

HAZMAT Incident Reporting: HAZMAT team use mobile applications to report and characterize on-scene HAZMAT observations and messages are prioritized and routed to public safety agencies to facilitate response.

Toll Gate Screening: Toll screeners use mobile applications to report and characterize suspicious behavior and messages are prioritized combined with photographic images and "speedpass" data and routed law enforcement or code enforcement agencies.

Disaster Reporting by First Responders: Responder organizations use mobile applications to report on damage assessment or needs post-incident. Observations are analyzed and routed to responsible responding organizations to facilitate a coordinated response. Early damage assessments may be done after hurricanes or floods by quickly taking pictures of buildings and rating the damage by picking a selection from the activity drop down list (Minor, Severe, Destroyed, etc).

Special Needs Population Assistance: First Responders and the general public use mobile applications to identify and report on individuals that may need additional assistance in a crisis or during an evacuation. Messages are routed to public safety agencies to ensure special needs are met.

Special Interest Reporting of Emergent Opportunities

Reporting on Emergent Sales Situations: The general public uses mobile applications to report on emergent sales situations like dwindling stock, or special in-store pricing that may not be well publicized. Messages are routed to individuals that subscribe to specific communities of interest.

Celebrity Spotting: The general public use mobile applications to identify and report on ad hoc celebrity sightings. Messages are routed to individuals that subscribe to specific communities of interest.

Entertainment Status Reporting: The general public uses mobile applications to report on the status of entertainment venues (length of line or wait, perceived "scene", potential altercations). Messages are routed to individuals that subscribe to specific communities of interest and law enforcement agencies as needed.

Hobbyist Reporting: Enthusiasts of a particular hobby use mobile applications to report on emergent activities (bird watching, trainspotting, etc.) within their special interest. Messages are routed to individuals that subscribe to specific communities of interest.

The foregoing examples are provided merely for the purpose of explanation and are in no way to be construed as limiting. While reference to various embodiments is made, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

Additionally, the purpose of the Abstract is to enable the patent office and the public generally, and especially the scientists, engineers and practitioners in the art who are not familiar with patent or legal terms or phraseology, to determine quickly from a cursory inspection the nature of the technical disclosure of the application. The Abstract is not intended to be limiting as to the scope of the present inventions in any way.

The invention claimed is:

1. A method for prioritizing and reporting an observation comprising the steps of:
   receiving an observation indicative of an impending event from a mobile device, the observation comprising location information and an activity classification selected from a predetermined set of activity classifications;
   calculating a priority for the observation based at least in part on the activity classification, the location information, a credibility of the source of the observation, and risk relevance, the credibility of the source being determined in part based on information identifying the source;
   determining a routing protocol for the observation based on the calculated priority, the routing protocol including an identifier of a recipient of the observation; and
   transmitting a report of the observation to at least one recipient based on the routing protocol.

2. The method of claim 1, wherein the priority is based at least in part upon a distance between the location information in the observation and a location of an object of interest associated with the recipient.

3. The method of claim 1, wherein the priority is based at least in part on the existence of a second observation from a different observer having a same activity classification as the activity in the observation and having location information that is within a threshold distance from the location information in the observation.

4. The method of claim 1, further comprising the step of combining the observation with a plurality of other observations in a manner indicative of the priority of the observation with respect to priorities of the plurality of other observations.

5. The method of claim 4, wherein the observation is combined with the plurality of other observations in a priority ordered list.

6. The method of claim 5, wherein the priority ordered list is rendered using a plurality of font sizes, each of the observation being assigned a font size based on the corresponding priority.

7. The method of claim 4, wherein the observation is combined with the plurality of other observations in a geospatial view.

8. The method of claim 7, wherein the geospatial view is rendered using icons based on the priority and type of activity and placed at the longitude and latitude of the observations.

9. The method of claim 7, wherein at least one object of interest associated with the at least one recipient is depicted in the geospatial view.

10. The method of claim 1, wherein the location information associated with the observation is determined by the mobile device.

11. The method of claim 1, wherein the observation includes additional information, further comprising the step of performing a content extraction on the additional information.

12. The method of claim 11, wherein the additional information includes at least one image, and wherein the content extraction comprises an image analysis.

13. The method of claim 12, wherein the image analysis comprises a facial recognition analysis.

14. The method of claim 11, wherein the additional information comprises textual information, and wherein the content extraction comprises a sentiment analysis.

15. A system for prioritizing and reporting an observation, the system comprising:
   at least one mobile device, the mobile device configured to execute an application for preparing an observation, the observation comprising location information determined by the mobile device and an activity classification, the activity classification being selected by a user of the mobile device from a predetermined set of activity classifications; and
   a server, the server being configured to perform the steps of
      receiving an observation indicative of an impending event from a mobile device, the observation comprising location information and an activity classification selected from a predetermined set of activity classifications;
      calculating a priority for the observation based at least in part on the activity classification, the location information, a credibility of the source of the observation, and risk relevance, the credibility of the source being determined in part based on information identifying the source;
      determining a routing protocol for the observation based on the calculated priority, the routing protocol including an identifier of a recipient of the observation; and
      transmitting a report of the observation to the at least one recipient based on the routing protocol.

16. The system of claim 15, wherein the server is further configured to serve a display of the observation together with a plurality of other observations in a manner indicative of the priority of the observation with respect to priorities of the plurality of other observations.

17. The system of claim 16, wherein the observation is combined with the plurality of other observations in a priority ordered list.

18. The system of claim 16, wherein the observation is combined with the plurality of other observations in a geospatial view.

* * * * *

UNITED STATES PATENT AND TRADEMARK OFFICE
CERTIFICATE OF CORRECTION

PATENT NO.        : 8,874,071 B2                              Page 1 of 1
APPLICATION NO.   : 13/279022
DATED             : October 28, 2014
INVENTOR(S)       : Michael Jay Sherman et al.

It is certified that error appears in the above-identified patent and that said Letters Patent is hereby corrected as shown below:

Title page

Item (75) Inventors: Change "Lindwood" to --Linwood--.

Signed and Sealed this
Fourth Day of August, 2015

Michelle K. Lee
*Director of the United States Patent and Trademark Office*